Aug. 8, 1961 S. M. RUBENS 2,995,631

MAGNETIC READING DEVICE

Filed Oct. 25, 1951 2 Sheets-Sheet 1

INVENTOR
SIDNEY M. RUBENS
BY Cushman, Darby & Cushman
ATTORNEY

Aug. 8, 1961 S. M. RUBENS 2,995,631

MAGNETIC READING DEVICE

Filed Oct. 25, 1951 2 Sheets-Sheet 2

INVENTOR
SIDNEY M. RUBENS

BY Cushman, Darby & Cushman

ATTORNEY 2,995,631
Patented Aug. 8, 1961

2,995,631

MAGNETIC READING DEVICE

Sidney M. Rubens, Falcon Heights, Minn., assignor, by mesne assignments, to Sperry Rand Corporation, a corporation of Delaware Filed Oct. 25, 1951, Ser. No. 253,189
22 Claims. (Cl. 179—100.2)

The present invention is concerned with electrical devices for reading magnetically recorded information, and particularly, with a magnetic reading system which does not absolutely depend for its operation upon relative motion between the reading device and a magnetic recording medium. Basically, devices according to the present invention may be used with stationary or movable records. The term "static" as used herein, will be employed to describe a magnetized record which is either completely stationary with respect to the reading device, or is moving relatively slowly.

The use of relatively stationary magnetic cores in detecting magnetic field intensity, and in so-called "flux valve" compass systems, is well known in the art. The present invention constitutes an improvement in principle and in construction over the above mentioned devices, and is concerned with adaptations of this improved device to the detection of magnetic fields of small extent, such as those produced by the magnetized portions of magnetic media on which telegraphone signals or digital information have been decorded. By the present invention, such readings can be obtained without materially affecting the remanent magnetization of the recorded signals.

It is accordingly an object of this invention to provide a magnetic reading device capable of detecting a magnetic flux as from a ferromagnetic recording medium regardless of its velocity, rather than by necessity detecting the rate of change of flux from a moving field.

It is accordingly an object of this invention to provide a magnetic reading device capable of detecting a magnetic flux as from a ferromagnetic recording medium regardless of its velocity, rather than by necessity detecting the rate of change of flux from a moving field, and wherein the reading operation will not materially affect the field being detected.

It is another object of this invention to provide a magnetic reading device in which the magnetic head comprises a reading gap and a coiled core, such core consisting of a tubular portion orthogonally united with another core-portion of conventional two-legged form.

It is another object of this invention to provide a magnetic reading device in which the magnetic head comprises a reading gap and a current carrying core.

It is a further object of this invention to provide a magnetic reading device in which there is a limited or negligible amount of mutual inductive coupling between the primary winding of the core-portion and the output winding of the two-legged core-portion.

It is yet another object of this invention to provide a magnetic reading device not only capable of detecting the presence of magnetic flux from a comparatively static recording medium, but also able to discern the intensity and relative direction of magnetization therein.

It is still a further object of this invention to provide a magnetic reading device in which the reading operation is performed with the aid of a separate, cyclically varying magnetic flux of any suitable frequency induced in the core-portion by an oscillatory M.M.F.

It is still another object of this invention to provide a magnetic reading device for reading magnetically recorded data in which the magnetic flux through the core-portion cannot alter or erase the information on the recording medium.

It is yet another object of this invention to provide a magnetic reading device which, by reason of specially designed compensating windings and shielding, will be substantially unaffected by the earth's field or other stray magnetic fields.

Other objects and advantages will become further apparent from the following detailed description and from the appended claims. The invention may be best understood in connection with the accompanying drawings wherein the invention is embodied in specific forms.

Referring to the drawings.

While it will become clear as this description proceeds that a great many combinations of dimensions, etc. may be employed, a sample specification will be given, but not in a limiting sense. Devices according to the herein sample specifications have been very successfully operated.

Figure 1:
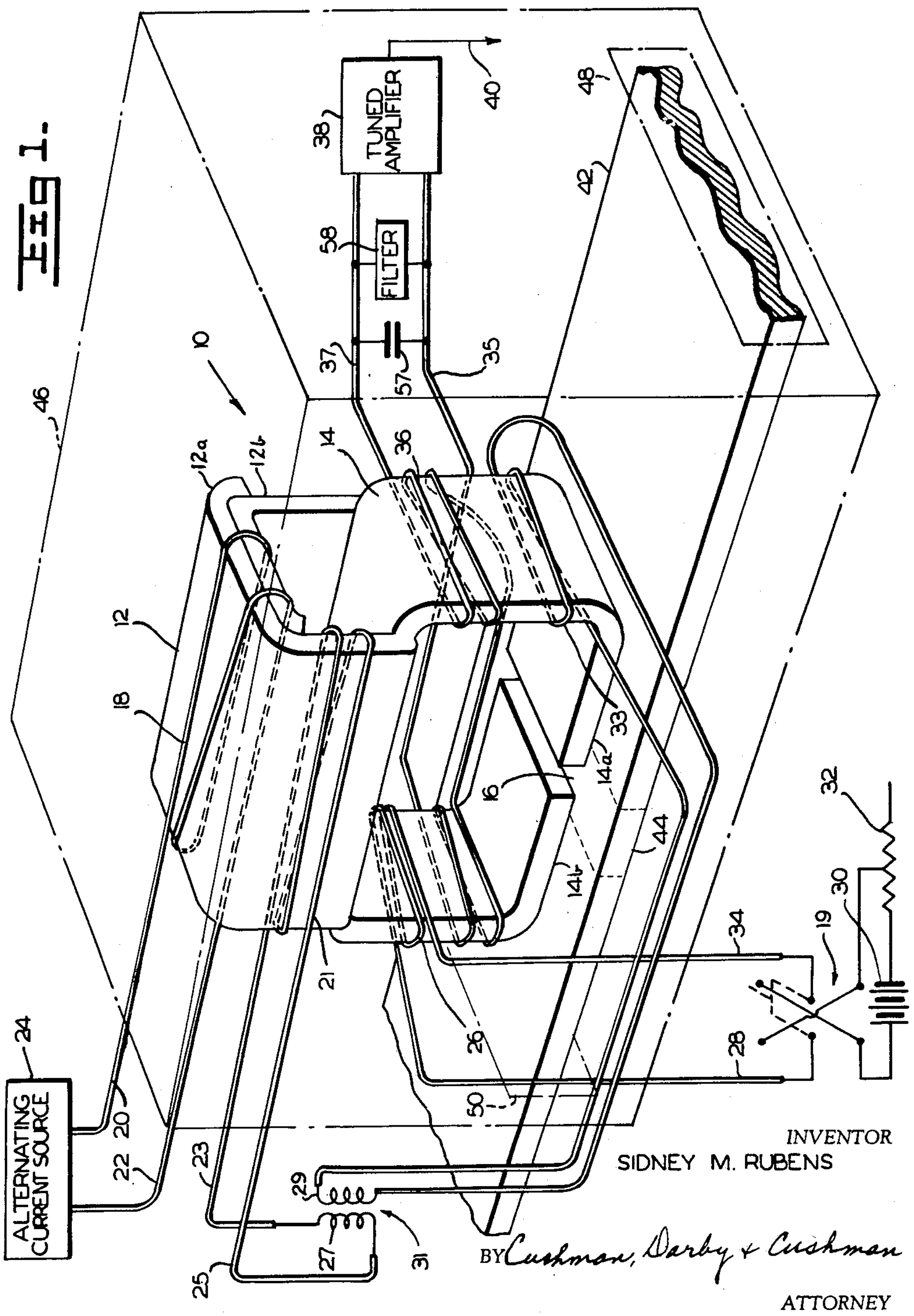
FIGURE 1 is a combined schematic and structural drawing which displays a first embodiment of a magnetic reading system and its associated circuitry.

Referring to FIGURE 1, a magnetic core member represented generally as 10 has a tubular core-portion 12 orthogonally united with a two-legged core-portion 14. Both such core-portions 12, 14 may, as illustrated, be cut and bent from a single sheet of some highly permeable ferromagnetic material such as "Mumetal," "Permalloy," or "4750 alloy," or may be molded from a ferromagnetic ferrite. Core-portion 12 is shown well overlapping parts **12*a* and 12*b*. However, this overlapping is simply to increase the area of contact and may be dispensed with if desired. A molded core, for example, would have no need for overlapping. The two legs 14*a* and 14*b* of the core 14 are opposed in such a manner as to form a relatively narrow nonmagnetic gap 16**, which may be about 0.001 inch wide.

Upon the tubular core 12 is coiled a primary winding 18 of 50 to 100 turns. The two ends 20, 22 of winding 18 are joined to the terminals of an alternating current source 24 of high frequency, for example, 10 kc./second. Also, coiled on the tubular core 12 is a compensating winding 21 of 5 turns; its two ends 23 and 25 are joined to the primary winding 27 of an air-core transformer 31. The secondary 29 of this transformer is connected with yet another compensating winding 33 of turns wound on core leg **14*a***.

A bias winding 26 of 50 turns is wound around the leg **14*b* of core 14 and its two ends 28, 34 are connected to a source of direct bias current (here represented by a battery 30) through a double-pole reversing switch 19. The negative terminal of the battery 30 is joined to a variable resistor 32, the respective values of these two elements being such as to produce a bias current which may be varied from a fraction of a milliampere up to 10 milliamperes. Winding 26** will carry a fraction of 1 ampere-turn (more may tend to alter the record).

An output winding 36 of 1000 or more turns preferably consists of two equal windings, one coiled about each leg of core 14 and connected in series aiding. As viewed in FIGURE 1, the two ends 35, 37 of winding 36 are connected directly to an amplifier 38, tuned to the second harmonic of the frequency of the current source 24. The output of the amplifier 38 appears on line 40.

Winding 36 is tuned to twice the frequency of source 24 with capacitor 57. The output leads from 57 are shunted by an electrical filter 58 which rejects the frequency of the current source 24, in a manner well known to those skilled in the art.

The particular embodiment illustrated in FIGURE 1 was designed for use in connection with magnetic tape as the recording medium. The tape 42 passes under the gap 16 in the direction indicated by the arrow in FIGURE 2. For the sake of example, a small portion 44 of the tape 42 has been marked off with dotted lines to represent a single magnetized section, called a "spot."

To assist in protecting the windings from stray magnetic fields and the earth's magnetic influence, a box shield 46 (shown in dotted lines in FIGURE 1) is constructed of 0.014 inch thick mumetal or other highly permeable ferromagnetic material suitable to enclose the core 10 and portions of the tape 42 adjacent to it. Small windows 48, 50 are cut through the ends of the shield 46 to permit the entrance and exit of the tape 42.

The sequence of events in the operational theory of this invention may be understood best in connection with a typical example. Let the A.C. source 24 be caused to oscillate electrically, thereby generating a sinusoidal voltage of 10 kc./second frequency. Thereby current may be caused to flow in primary winding 18 and the tubular core 12 may be magnetized to saturation in each direction cyclically. Thus, the permeability of the core 12 and the reluctance shunting the air gap 16 vary at a frequency double that of the A.C. source 24, viz., 20 kc./second.

Figures 2, 3, 4, 5, 6:
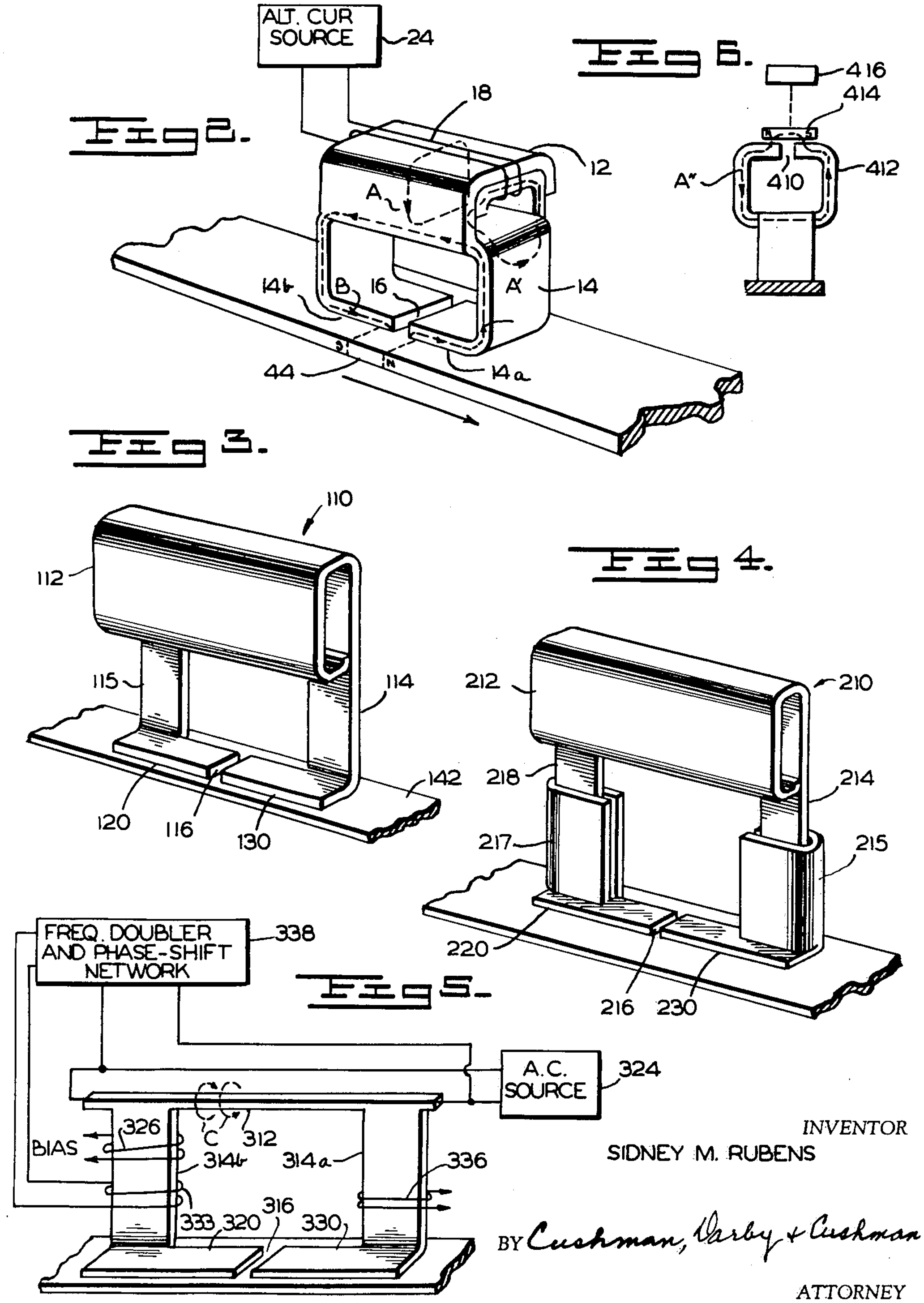
FIGURE 2 is a simplified view of the reading device of FIGURE 1 and the magnetic flux patterns generated therein.
FIGURE 3 illustrates an alternative configuration of the reading device according to the present invention.
FIGURE 4 illustrates yet another form of core involving certain design improvements over that in FIGURE 3, which renders it more easily manufactured while yet preserving the advantages of that device.
FIGURE 5 illustrates yet another embodiment of the reading device.
FIGURE 6 illustrates an additional arrangement for creating a flux in a core-portion of the reading device.

Referring now to FIGURE 2, a simplified view of the core-portions 12, 14 is shown, together with dotted lines indicating the direction of various magnetic flux patterns therein. Arrow A on the tubular core 12 indicates the direction of the flux path resulting from current flow in the primary winding 18. As stated above, core 12 becomes saturated twice in each cycle of the frequency of the source 24 with the flux A. A portion of the flux A may begin to enter the legs **14*a* and 14*b* of core 14, but this flux returns to the tube 12, as indicated by the flux path A'. Thus, the flux resulting from energizing the winding 18 of FIGURE 2 does not cross the gap 16 or alter the magnetic record 44**. This constitutes a very significant phase of the present invention.

When the gap 16 is over a magnetized area of the tape 42, such as indicated by the polarity of spot 44 of FIGURE 2, some of the flux, as shown by the arrow B, threads the core-portion 14. Because the core 14 is driven to saturation twice a cycle, the reluctance to the flux B between the two legs of core 14 varies at twice the frequency of the A.C. source 24.

When the tubular core-portion 12 is saturated peripherally in either direction, the reluctance of the entire core 10 is a maximum; and when the magnetic flux through the core-portion 12 is zero, the reluctance of the entire core 10 is a minimum. If the tape 42 is positioned so that a magnetized spot 44 lies directly under the gap 16, some of the flux from spot 44 traverses both the two-legged core-portion 14 and core-portion 12 and links the output winding 36 (winding 36 not shown in FIGURE 2). This flux path is as indicated by arrow B in FIGURE 2. Throughout the core 10, the reluctance to this tape-induced flux is varying harmonically, at a frequency which is twice that of the A.C. source 24; hence, the time variation of flux linkages due to the magnetized spot 44, resulting from the cyclically varying reluctance through the core 12, produces an E.M.F. of twice the A.C. source frequency in the output winding 36. The greater the source frequency, the larger will be this induced second harmonic E.M.F. Eddy currents may limit the rate of change of flux in the core 10 to limit the frequency of the second harmonic E.M.F. unless the sheet material from which the core is fabricated is so thin that complete penetration of the core material by the flux is possible at the second harmonic frequency. In general, to the extent that complete flux penetration is not prevented by eddy currents, the higher the source frequency, the greater will be the sensitivity of the device. Eddy current effects can be minimized by the use of suitable ferromagnetic ferrites for core material. The voltage produced in winding 36 is transmitted to the amplifier 38, the output of which will be of one value when no magnetized spot is under the gap 16, and will be of a different value when a spot is so placed; thus the presence of a spot is detected without relative motion between tape and reading head.

While the device as thus far described is operable, nevertheless the decoupling of the windings 18 and 36 is not perfect, and an E.M.F. of 10 kc./second (fundamental) frequency is, therefore, induced in the winding 36. This fundamental is partially eliminated from the output by tuning the amplifier 38 to reject the 10 kc./second frequency and to pass only its second harmonic, or 20 kc./second, as above explained. Also, the mutual coupling between windings 18 and 36 is minimized as follows: (1) the mutual inductance between 18 and 36 can be made small by minimizing the peripheral dimensions of tube 12; (2) a compensating winding 21 is coiled around the tubular core 12 of FIGURE 1 and the winding 33 is coiled around the leg **14*a* of core 14. Windings 21 and 33 are inductively coupled through the air-core transformer 31, as shown, so that any E.M.F. mutually induced in winding 36 by current flowing in winding 18** is caused to be cancelled to a large extent, the direction of the windings being proper, as illustrated, for such cancellation effect.

Remanent magnetization in the tubular core 12 due to its history or its orientation in the earth's magnetic field and the slight residual mutual inductance of the windings 18, 36 tend to produce in winding 36 a "background" second harmonic E.M.F. of the A.C. source frequency. In addition to the box 46 which shields the device from the earth's magnetic influence and other stray magnetic fields, a further means of minimizing the effects of imperfect shielding and of remanent magnetization in the core is provided in the form of the bias winding 26 on one or the other of the legs of the core 14. Biasing current supplied from a D.C. voltage source (here represented by a battery 30) is adjustable by means of a variable resistor 32 and a reversing switch 19. The effect of the residual magnetization is adequately compensated by applying a bias M.M.F. of approximately 0.1 ampere-turn, so long as the orientation of the reading device in the earth's magnetic field remains fixed. This magnitude of bias is insufficient to alter the magnetic record on the tape 44, since the field produced across the reading gap 16 is only 1.0 oersted or less.

Another important function of the bias winding 26 is to keep core 14 in a desired initial state of magnetization. By this means, the direction, as well as the intensity of magnetization of a spot 44, can be determined. If the direction of magnetization of the spot 44 is such to increase the magnetization of the core-portion 14, the output signal increases. Conversely, if the magnetization of the spot 44 tends to decrease the initial magnetization of the core-portion 14, the output signal also decreases.

The highest practicable speed at which the reading device can respond to magnetic records is determined by the frequency of the A.C. source 24, since several (preferably, about 10) cycles of this frequency must occur during the time required for the magnetized spot 44 to pass beneath the gap 16. The lowest practical speed is zero.

Referring now to FIGURE 3, there is illustrated an alternative construction of a core which can profitably be employed with windings and associated circuitry similar to those shown in connection with the core of FIGURE 1. A core 110 may comprise a tubular portion 112 orthogonally united with a second core portion having two legs 114, 115. As shown, the entire core 110 may be cut and bent from a single metallic sheet, so that the legs 114, 115 lie in the same plane as, and are actually an extension of, one wall of the tubular core-portion 112. Pole pieces 120, 130 may be bent as extensions of legs 115, 114, respectively, perpendicular thereto and also parallel to the axis of tubular core-portion 112, being opposed to form a gap 116. The advantage of such a core is that pole pieces 120, 130 may be made much narrower than those in FIGURE 1, so that the overall width of the reading head need be little wider than the track tape 142 upon which it operates. Another advantage is that smaller physical dimensions of the head make possible closer spacing between each of a plurality of such heads, and consequently more recording tracks in a tape of given width.

FIGURE 4 illustrates another variation of core form, also suitable for use in connection with windings and associated circuitry similar to those of the core in FIGURE 1. As before a core represented generally as 210 may comprise a tubular portion 212 orthogonally associated with a second core-portion having two legs 215, 217. The legs 215, 217 are U-shaped jacket pieces suitable for closely engaging extension pieces 214, 218 from the core-portion 212. Pole pieces 220, 230 may be bent as extensions of jackets 217, 215, respectively, being perpendicular to same and also parallel to the axis of tubular core 212, opposing so as to form a gap 216. As in the device of FIGURE 3, a narrow pair of pole pieces is possible with the same resultant advantages. The advantage of the core of FIGURE 4 over that of FIGURE 3 is that it is more easily manufactured (in three pieces). In order to have maximum magnetic linkage between the legs 215, 217 and the extension pieces 214, 218, respectively, it is necessary that the air gaps created by this leg-and-extension engagement be of as low reluctance as possible. This is accomplished by making the area of such engagement large and by keeping the gap between the extension pieces 214, 218 and the legs 215, 217 small.

Yet another embodiment of my invention will now be described in connection with FIGURE 5. In this figure, a reading device is characterized by provision of a simple length of highly permeable ferromagnetic wire or rod 312 joining the upper ends of two legs **314*a* and 314*b*. The ends of the wire 312 are joined to the terminals of an A.C. source 324. Legs 314*a* and 314*b* are bent as are legs 114 and 115 of FIGURE 3 to form members 320 and 330 which define a gap 316**.

The magnetic flux pattern in the core-portion 312 assumes the well known circular pattern common to all current-carrying wires, as indicated by the dotted arrows C in FIGURE 5. A winding 336 is provided about one of the legs **314*a*, *b* and, accordingly, a flux tending to thread the legs 314*a*, *b* and wire 312 by reason of a flux spot on the tape will be cyclically modified to generate an output voltage in winding 336**.

Suitable compensation of the device of FIGURE 5 to render peak performance may be realized as follows: A winding 333 may be wound about core leg **314*a* or 314*b*, or partially about both. This winding will be connected to a frequency doubling and phase shift circuit 338, the latter being fed from A.C. source 324. Winding 333 is coiled, as shown, to be in such direction as to permit cancellation of the E.M.F. induced by any mutual coupling between the wire 312 and the legs 314*a* and 314*b*. Cancellation is carried out by adjusting circuit 338** so that the amplitude and phase thereof are in opposition to the E.M.F. induced by the mutual coupling.

A bias winding 326, analogous to winding 26 of FIGURE 1, may be employed as required in the device of FIGURE 5. However, the use of the D.C. bias winding 326 may even be eliminated by a suitable adjustment of the amplitude and phase of the E.M.F. across winding 333.

It will be understood that the frequency doubling technique just described in connection with FIGURE 5 may equally well be employed in the device of FIGURE 1. That is, the windings 21 and 33 of FIGURE 1 may be replaced with the frequency doubling technique. Furthermore, it will be understood that a current may be caused to flow lengthwise in the tubular portions of the embodiments of FIGURES 1–4. Such current will set up a flux about the tubular portion which will have the same effect as the flux about the wire in FIGURE 5.

In the above description second harmonics and frequency doubling techniques have been described. However, those skilled in the art upon reading this disclosure will be aware that other harmonics are present and can be used if desired, although they are of lesser amplitude. Any even harmonic (4th, 6th, 8th, etc.) can be used to determine both magnitude and direction of magnetization of the record. Odd numbered harmonics can be used to determine the magnitude (but not the direction) of magnetization.

An additional modification of the invention is shown in FIGURE 6. In this figure, which is an end view of structure as in FIGURES 1–4, a gap 410 is provided in the tubular portion 412 and adjacent this gap is a magnetized member 414. Member 414 is arranged to be vibrated toward and away from the gap 410 by connection to a piezoelectric crystal 416. Accordingly, flux from member 414 which tends to thread the tubular portion 412 as along dash line A″ will be so in varying amounts as the distance between tube 412 and member 414 varies in step with the excitation of crystal 416. Therefore, the reluctance of tube 412 will vary, as in the previously described embodiments.

While preferably I propose that my novel core structure be employed with pick-up windings for detecting the presence of flux, it will be understood that my core structure may also be used to advantage in systems wherein flux in the core affects the impedance of the main A.C. coil (18 in FIGURE 1, etc.) to change the frequency of the A.C. source, to provide an output signal.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. The scope of the invention is to be determined from the appended claims.

I claim:

1. In a magnetic field detecting device for reading recorded magnetic flux signals in a magnetizable record member, means forming a first magnetically permeable path for carrying flux to be detected, portions of the first path forming a non-magnetic gap in the first path to be positioned in proximity to a record having recorded therein magnetic signals to be read so that said record flux may enter and pass through said first path, means forming a second magnetically permeable path having at least a portion thereof in common with the means forming the first path, means for establishing a cyclically varying flux in the second path at substantially right angles to the first path for cyclically varying the reluctance of the first path whereby the cyclically varying flux cannot bridge the gap to thereby affect the recorded signal, and means inductively associated with the first path and responsive to variation in the reluctance of the first path for producing an output voltage indicative of a magnetic flux in the first path, the means forming the second path being arranged to carry a cyclically varying electric current in a direction substantially parallel to the portion of the first path common to the first and second paths for varying the reluctance of the second path.

2. In a magnetic field detecting device for reading recorded magnetic flux signals in a magnetizable record member, means comprising magnetically permeable material forming a magnetic flux path, the flux path means further comprising a non-magnetic and electrically non-conductive pick-up gap, and means for connecting at least a portion of the flux path means across a source of cyclically varying electric current so that cyclically varying current will flow in the said portion of the flux path for varying the reluctance of the path, the arrangement being such that the current cannot flow through said gap and therefore flux resulting from said current does not exist in the vicinity of said gap to affect the recorded flux.

3. A device as in claim 2 in which the said flux path is generally rectangular in form with the gap in one side, and the said current carrying portion of the flux path comprises the opposite side of the rectangle.

4. In apparatus for detecting remnant magnetization in a record member irrespective of relative motion between the record and the apparatus, means of magnetically permeable material forming a first magnetic flux path and a second magnetic flux path, two closely spaced apart portions of the means forming the first path defining a gap therebetween to be placed in proximity to the record to be read, a portion of the second flux path being common to a portion of the first flux path, means forming a single uni-directional source of fluctuating magnetomotive force in the second flux path, the arrangement being such that the reluctance of the second path fluctuates in accordance with the magnetomotive force, the reluctance of the first path therefore also fluctuating conformably because of the common portion of the two paths, and means including a voltage responsive means inductively coupled to the first path at a position apart from the portion thereof in common with the second path, the arrangement being such that flux from the record member entering the first path at said gap and threading said first path will vary in accordance with said reluctance variations of the first path to thereby generate a fluctuating voltage in said inductively coupled means to thereby energize said voltage responsive means.

5. A device as in claim 4 wherein the second path includes a gap and wherein the means for establishing the cyclically varying flux in the second path includes a magnetized member, and means for cyclically moving said member in the vicinity of said gap for cyclically altering the amounts of flux threading the second path.

6. Apparatus as in claim 4 wherein the first path crosses the second path at said common portion at substantially right angles thereto to thereby inhibit passage of flux from the second path through the gap of the first path.

7. In apparatus for detecting remnant magnetization in a record member irrespective of relative motion between the record and the apparatus, means of magnetically permeable material forming a first magnetic flux path and a second magnetic flux path, two closely spaced apart portions of the means forming the first path defining a gap therebetween to be placed in proximity to the record to be read, a portion of the second flux path being common to a portion of the first flux path, means forming at least one source of fluctuating magnetomotive force in the second path, the arrangement being such that the reluctance of the second path fluctuates in accordance with the magnetomotive force, the reluctance of the first path therefore also fluctuating conformably because of the common portion of the two paths, means including a voltage responsive means inductively coupled to the first path at a position apart from the portion thereof in common with the second path, the arrangement being such that flux from the record member entering the first path at said gap and threading said first path will vary in accordance with said reluctance variation of the first path to thereby generate a fluctuating voltage in said inductively coupled means to thereby energize said voltage responsive means, the inductively coupled means including means for cancelling voltages therein of frequency equal to one-half the frequency of the reluctance fluctuations caused in the common portion of the first and second paths.

8. Apparatus as in claim 7 wherein the voltage cancelling means comprises an amplifier tuned to the frequency of said reluctance fluctuations in the second path.

9. In apparatus for detecting remnant magnetization in a record member irrespective of relative motion between the record and the apparatus, means of magnetically permeable material forming a first magnetic flux path and a second magnetic flux path, two closely spaced apart portions of the means forming the first path defining a gap therebetween to be placed in proximity to the record to be read, a portion of the second flux path being common to a portion of the first flux path, means forming at least one source of fluctuating magnetomotive force in the second path, the arrangement being such that the reluctance of the second path fluctuates in accordance with the magnetomotive force, the reluctance of the first path therefore also fluctuating conformably because of the common portion of the two paths, means including a voltage responsive means inductively coupled to the first path at a position apart from the portion thereof in common with the second path, the arrangement being such that flux from the record member entering the first path at said gap and threading said first path will vary in accordance with said reluctance variation of the first path to thereby generate a fluctuating voltage in said inductively coupled means to thereby energize said voltage responsive means, the means forming the second path including a portion of tubular form and the means of the first path forming the gap therebetween comprising leg members extending from the said tubular portion.

10. Apparatus as in claim 9 wherein the means forming the magnetomotive force source includes a winding wound longitudinally through and about the tubular portion.

11. In apparatus for detecting remnant magnetization in a record member irrespective of relative motion between the record and the apparatus, means of magnetically permeable material forming a first magnetic flux path and a second magnetic flux path, two closely spaced apart portions of the means forming the first path defining a gap therebetween to be placed in proximity to the record to be read, a portion of the second flux path being common to a portion of the first flux path, means forming at least one source of fluctuating magnetomotive force in the second path, the arrangement being such that the reluctance of the second path fluctuates in accordance with the magnetomotive force, the reluctance of the first path therefore also fluctuating conformably because of the common portion of the two paths, means including a voltage responsive means inductively coupled to the first path at a position apart from the portion thereof in common with the second path, the arrangement being such that flux from the record member entering the first path at said gap and threading said first path will vary in accordance with said reluctance variation of the first path to thereby generate a fluctuating voltage in said inductively coupled means to thereby energize said voltage responsive means, the apparatus including means for passing electric current through the second flux path for providing said source of magnetomotive force.

12. In apparatus for detecting remnant magnetization in a record member irrespective of relative motion between the record and the apparatus, means of magnetically permeable material forming a first magnetic flux path and a second magnetic flux path, two closely spaced apart portions of the means forming the first path defining a gap therebetween to be placed in proximity to the record to be read, a portion of the second flux path being common to a portion of the first flux path, means forming at least one source of fluctuating magnetomotive force in the second path, the arrangement being such that the reluctance of the second path fluctuates in accordance with the magnetomotive force, the reluctance of the first path therefore also fluctuating conformably because of the common portion of the two paths, means including a voltage responsive means inductively coupled to the first path at a position apart from the portion thereof in common with the second path, the arrangement being such that flux from the record member entering the first path at said gap and threading said first path will vary in accordance with said reluctance variation of the first path to thereby generate a fluctuating voltage in said inductively coupled means to thereby energize said voltage responsive means, the second flux path comprising a wire-like portion and the apparatus including means for passing an electric current through the wire-like portion from end to end thereof for providing said source of magnetomotive force.

13. In apparatus for detecting remnant magnetization in a record member irrespective of relative motion between the record and the apparatus, means of magnetically permeable material forming a first magnetic flux path and a second magnetic flux path, two closely spaced apart portions of the means forming the first path defining a gap therebetween to be placed in proximity to the record to be read, a portion of the second flux path being common to a portion of the first flux path, means forming at least one source of fluctuating magnetomotive force in the second path, the arrangement being such that the reluctance of the second path fluctuates in accordance with the magnetomotive force, the reluctance of the first path therefore also fluctuating conformably because of the common portion of the two paths, means including a voltage responsive means inductively coupled to the first path at a position apart from the portion thereof in common with the second path, the arrangement being such that flux from the record member entering the first path at said gap and threading said first path will vary in accordance with said reluctance variation of the first path to thereby generate a fluctuating voltage in said inductively coupled means to thereby energize said voltage responsive means, the apparatus further including coil means wound about a portion of the first path for carrying a cyclically varying current of frequency equal to the frequency of reluctance variations in the second path for cancelling fluxes in the first path generated by mutual inductive coupling between the first and second path.

14. In apparatus for detecting remnant magnetization in a record member irrespective of relative motion between the record and the apparatus, means of magnetically permeable material forming a first magnetic flux path and a second magnetic flux path, two closely spaced apart portions of the means forming the first path defining a gap therebetween to be placed in proximity to the record to be read, a portion of the second flux path being common to a portion of the first flux path, means forming at least one source of fluctuating magnetomotive force in the second path, the arrangement being such that the reluctance of the second path fluctuates in accordance with the magnetomotive force, the reluctance of the first path therefore also fluctuating conformably because of the common portion of the two paths, means including a voltage responsive means inductively coupled to the first path at a position apart from the portion thereof in common with the second path, the arrangement being such that flux from the record member entering the first path at said gap and threading said first path will vary in accordance with said reluctance variation of the first path to thereby generate a fluctuating voltage in said inductively coupled means to thereby energize said voltage responsive means, the apparatus further including a coil wound about the first path for carrying a direct current for compensating for extraneous constant fluxes present in the first path and for causing the direction of the flux of a field to be detected from the record member to provide at least two levels of output in the output in the voltage responsive means for indicating the direction of the detected remnant flux in the record.

15. In apparatus for detecting remnant magnetization in a record member irrespective of relative motion between the record and the apparatus, means of magnetically permeable material forming a first magnetic flux path and a second magnetic flux path, two closely spaced apart portions of the means forming the first path defining a gap therebetween to be placed in proximity to the record to be read, a portion of the second flux path being common to a portion of the first flux path, means forming at least one source of fluctuating magnetomotive force in the second path, the arrangement being such that the reluctance of the second path fluctuates in accordance with the magnetomotive force, the reluctance of the first path therefore also fluctuating conformably because of the common portion of the two paths, means including a voltage responsive means inductively coupled to the first path at a position apart from the portion thereof in common with the second path, the arrangement being such that flux from the record member entering the first path at said gap and threading said first path will vary in accordance with said reluctance variation of the first path to thereby generate a fluctuating voltage in said inductively coupled means to thereby energize said voltage responsive means, the apparatus further including a source of fluctuating voltage for driving the magnetomotive force, and means for changing the frequency of said source of fluctuating voltage in response to detected changes in the amount of flux to be detected threading the first path.

16. A magnetic reproducing device for sensing the presence of a given magnetomotive force recorded in a magnetizable medium, comprising a first magnetic core so related to said medium as to be subjected to the magnetomotive force recorded therein, a second magnetic core, magnetizing means associated with said second core for inducing a variable magnetic flux therein, means comprising a core section common to both said cores and defining a variable-reluctance path for magnetic flux induced by said magnetomotive force wherein a first portion of said flux path is cross magnetized by a substantial portion of the variable flux in said second core thereby to vary the effective reluctance of said path with respect to said magnetomotive force and in which a second portion of said flux path is substantially free of the variable flux in said second core, and an output winding inductively coupled to the second portion of said path for producing a variable output voltage indicating the presence of said magnetomotive force as said variable magnetizing means causes the effective reluctance of said common section to vary.

17. A static magnetic sensing device comprising a first magnetic circuit subjected to a static flux condition, a second magnetic circuit having a portion common to said first magnetic circuit wherein the flux produced in said circuits is substantially at right angles, a winding on said second magnetic circuit, a source of variable current coupled to said winding for producing a variable magnetic flux in said second magnetic circuit and thereby varying the effective reluctance of the portion common to both magnetic circuits, an output winding on said first magnetic circuit in which a voltage is induced indicative of the magnitude and direction of a static flux condition in said first magnetic circuit as the effective reluctance of said common portion is varied.

18. A primary magnetic circuit having a magnetomotive force, a second magnetic circuit having a portion common to said primary magnetic circuit, means producing a controlled flux field in said second magnetic circuit substantially at right angles to flux existing in said common portion due to said primary magnetic circuit, said controlled flux varying the effective reluctance of said primary magnetic circuit and thus causing the flux produced by said magnetomotive force to vary, a winding on said primary magnetic circuit in which a voltage is induced dependent upon the rate of change of said controlled flux field and the polarity and magnitude of the magnetomotive force of said primary magnetic circuit.

19. A static magnetic sensing device comprising a first magnetic circuit in which a stable flux condition exists, a second magnetic circuit joined to said first magnetic circuit so that a portion of each is common and the flux in each circuit is in a substantially transverse relationship in said common portion, a winding on said second magnetic circuit, a variable energy source coupled to said winding and operable to cause a variable flux to be produced in said second magnetic circuit to thereby vary the effective reluctance of said common portion and an output winding on said first magnetic circuit in which a voltage is induced when a stable flux condition exists in said first magnetic circuit and the reluctance of said common portion is varied.

20. A magnetic sensing device comprising at least one first magnetic circuit in which a stable flux condition may exist, a second magnetic circuit, means including a portion common to said first and second magnetic circuits wherein their flux paths are in a substantially transverse relationship, a winding on said second magnetic circuit, a source of variable electrical energy coupled to said winding so as to produce a variable flux in said second magnetic circuit and thereby vary the effective reluctance of said common portion, an output winding on said first magnetic circuit in which a voltage is induced when a flux condition exists in said first magnetic circuit and the reluctance of said common portion is varied.

21. A magnetic reproducing device comprising a pair of magnetic cores, means comprising a core section common to each of said cores wherein flux produced in said cores is substantially at right angles, a winding on each core, one of the said cores having an air gap remote from said common section whereat a static magnetomotive force produces an induced representative voltage in the winding of said one core when a varying voltage is applied to the winding of the other said core and produces a controlling flux in quadrature with that resulting from said magnetomotive force.

22. A device as in claim 16 wherein the first and second cores are constructed of magnetic material and which together define a figure 8 the respective loops of which are the first and second cores, with one loop of the figure 8 lying in a plane substantially at right angles to the plane of and intersecting the other loop, the one loop having a winding therethrough and a discontinuity remote from the intersection of said loops and in the form of a slot making in that loop a gap to which a magnetic record medium may be presented for reading, and the other loop having said magnetizing means in the form of a winding therethrough.

References Cited in the file of this patent

UNITED STATES PATENTS

| | | |
|---|---|---|
| 2,149,092 | Kettler | Feb. 28, 1939 |
| 2,373,096 | Bonell | Apr. 10, 1945 |
| 2,435,276 | Holmes | Feb. 3, 1948 |
| 2,468,554 | Hull | Apr. 26, 1949 |
| 2,488,341 | Slonczewski | Nov. 15, 1949 |
| 2,543,843 | Frosch | Mar. 6, 1951 |
| 2,580,208 | Wiegand | Dec. 25, 1951 |
| 2,581,209 | Shepard et al. | Jan. 1, 1952 |
| 2,591,070 | Howell | Apr. 1, 1952 |
| 2,608,621 | Peterson | Aug. 26, 1952 |
| 2,628,285 | Camras | Feb. 10, 1953 |
| 2,700,703 | Nordyke | Jan. 25, 1955 |

FOREIGN PATENTS

| | | |
|---|---|---|
| 224,992 | Switzerland | Apr. 1, 1943 |
| 270,675 | Switzerland | Dec. 1, 1950 |
| 592,241 | Great Britain | Sept. 11, 1947 |